Dec. 19, 1961 H. W. MOORE 3,013,737
METHOD AND HYDRAULICALLY DRIVEN
APPARATUS FOR WINDING COILS
Filed Nov. 15, 1957 4 Sheets-Sheet 1

INVENTOR.
HARRY W. MOORE
BY
Dybvig & Jacox
HIS ATTORNEYS

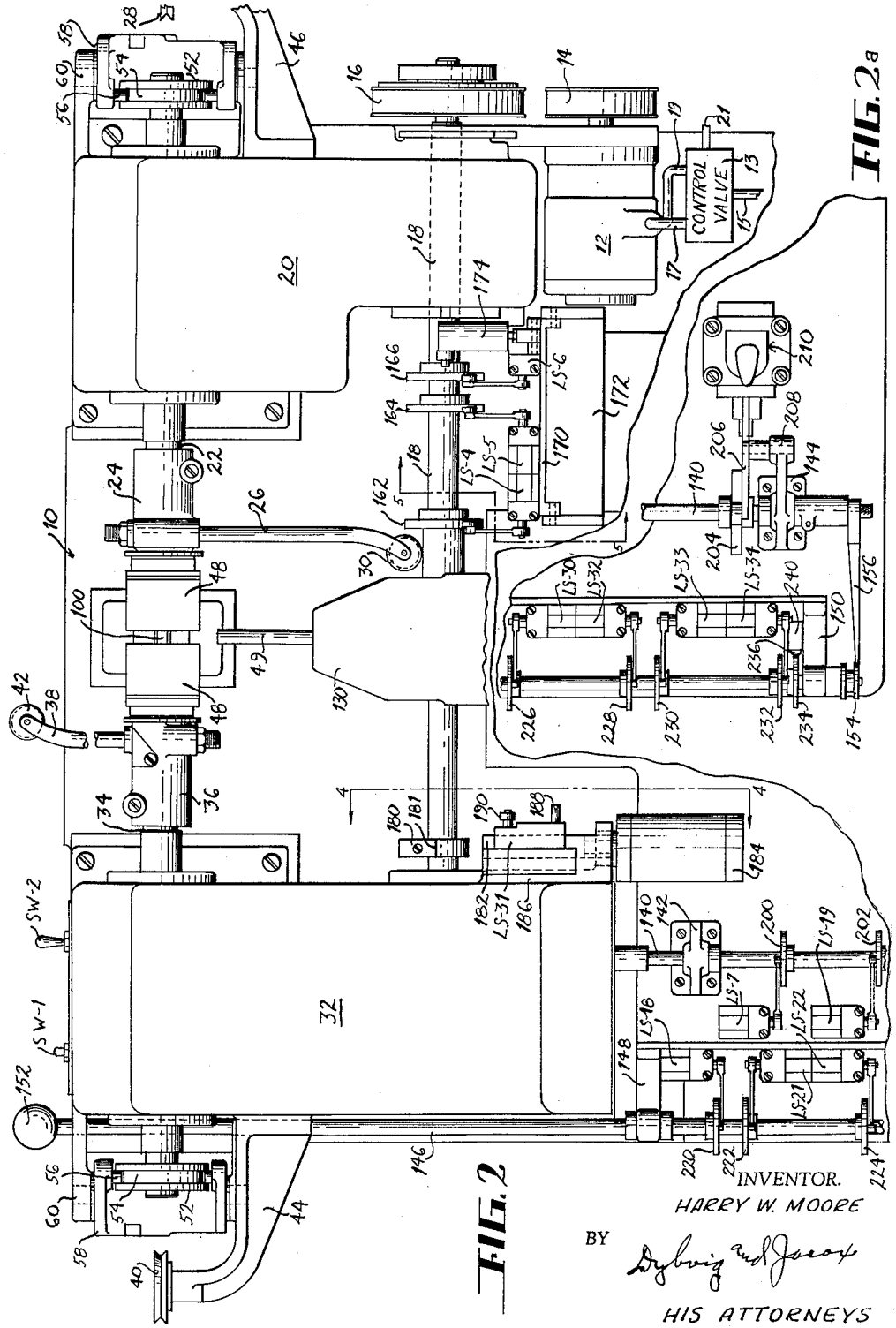

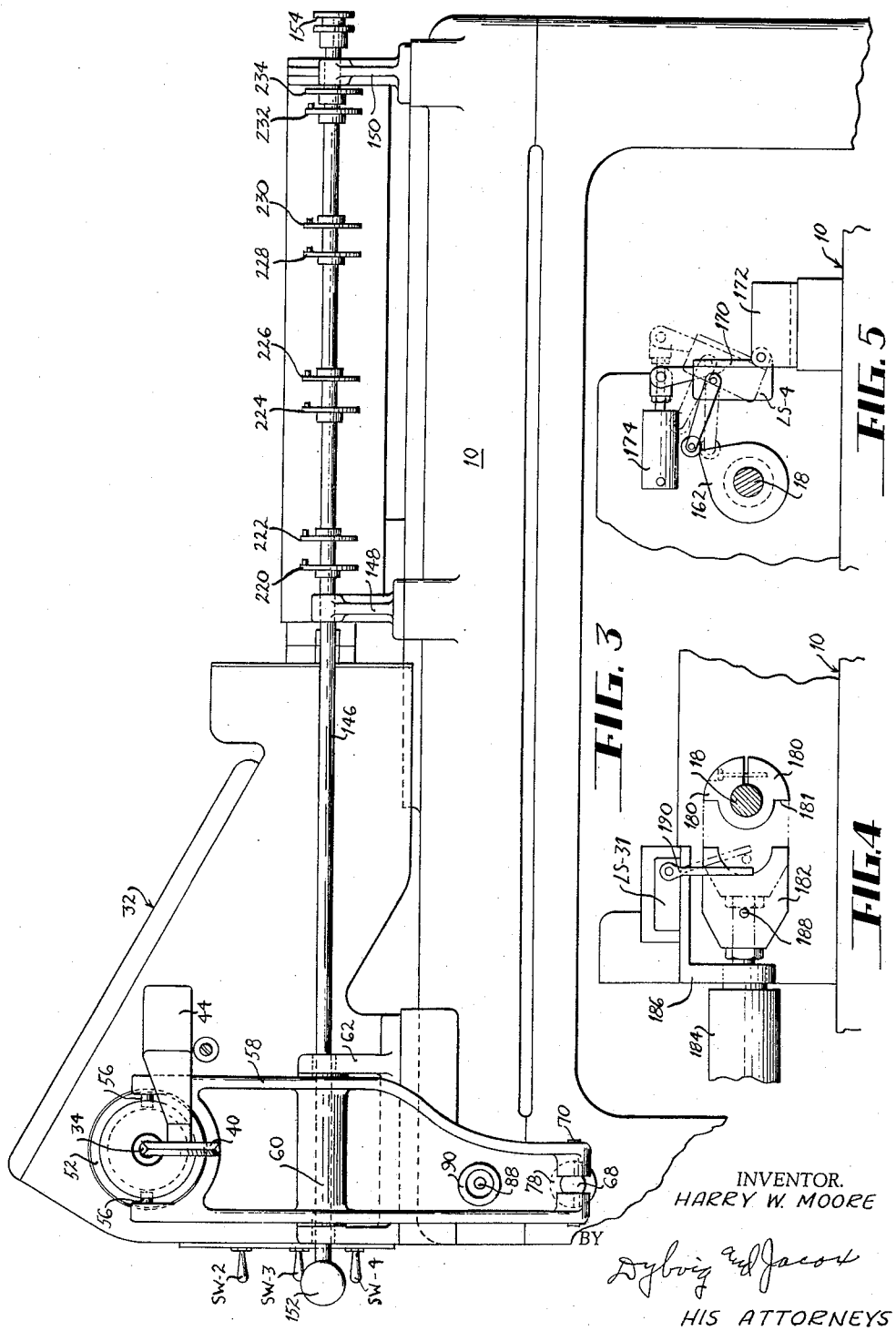

United States Patent Office 3,013,737
Patented Dec. 19, 1961

3,013,737
METHOD AND HYDRAULICALLY DRIVEN
APPARATUS FOR WINDING COILS
Harry W. Moore, 5051 Kittridge Road, Dayton 24, Ohio
Filed Nov. 15, 1957, Ser. No. 696,640
14 Claims. (Cl. 242—13)

This invention relates to a hydraulically driven coil winding machine and to a method for winding coils, and more particularly to a coil winding machine for winding armatures of various different basic types provided with flexible control elements compatible with the hydraulic power supply, although the invention is not necessarily so limited.

The coil winding machine of this invention is of the type designed for winding coils about a slotted armature. Ordinarily, the armature is a cylindrical member provided with a plurality of axially extending slots in the periphery thereof and the coils are wound into pairs of slots usually substantially diametrically opposed on the armature. In the ordinary sequence of events in the operation of machines of this type, a coil is wound first into a pair of substantially diametrically opposed slots by rotation of a flier supplying wire for winding the coil. When the coil has been wound, the rotation of the flier is stopped. The armature is rotated about its own axis to present a new pair of slots to the flier, then the flier is once again rotated to form a new coil. This sequence of operation is continued until the armature is fully wound.

In many applications, it is desired to wind two separate coils into each pair of slots in the armature. When this is to be done, a first coil is wound onto the armature, then the flier is stopped and the armature rotated about its own axis to present a new pair of slots to the flier. Then a short segment of wire is wound into one of the new slots in the armature by reverse rotation of the flier. Thereafter the armature is returned to its original position and a new coil wound in the original pair of slots over the first wound coil. The temporary movement of the armature to a new position, referred to as back indexing of the armature, serves to separate the two coils wound one upon the other in the same pair of slots of the armature, the separating segment of wire being wound into an adjacent slot in the armature. This type of winding is referred in the trade as a two coil per slot winding.

It is apparent that the two coil per slot winding requires that the flier go through numerous starts, stops and reverses in the winding of a single armature. In earlier coil winding machines designed to wind armatures of this type, electromechanical drive means have been commonly used for the flier or fliers which wind the armature. In such machines, the flier must be started, stopped, speeded up, slowed down and reversed in the direction of rotation by means of mechanical transmissions. Numerous objections are found in the use of such mechanical transmissions. A primary objection is that due to the tremendous number of starts and stops and reverses required of the flier or fliers in winding the armature, these mechanical transmissions are subjected to excessive mechanical wear. Failure in these transmissions is a common difficulty with coil winding machines.

It is therefore an object of this invention to provide a coil winding machine having a hydraulic drive eliminating the necessity for mechanical transmissions functioning to vary the speed and direction of rotation of the flier or fliers employed in the coil winding machine.

Another object of this invention is to provide control elements and control circuitry compatible with the hydraulic drive enabling the coil winding machine to continuously and automatically wind coils upon an armature member or the like.

Still another object of this invention is to provide a coil winding machine having improved control elements and control circuitry designed to make the machine fully automatic and sufficiently flexible that armatures of many basic types may be wound with the same machine.

Yet a further object of this invention is to provide a new and improved method for winding coils which is particularly suited to a hydraulically driven coil winding machine.

Other objects and advantages reside in the construction of parts, the combination thereof, the method of manufacture and the mode of operation, as will become more apparent from the following description.

In the drawings, FIGURE 1 is a front elevational view of the coil winding machine of this invention with parts broken away and other parts shown in section to disclose details of the coil winding machine.

FIGURE 2 is a top plan view of the coil winding machine of FIGURE 1 with portions broken away.

FIGURE 2a is an extension of FIGURE 2.

FIGURE 3 is a side elevational view of the coil winding machine of FIGURE 1 with portions broken away.

FIGURE 4 is a sectional view taken substantially along the line 4—4 of FIGURE 2.

FIGURE 5 is a sectional view taken substantially along the line 5—5 of FIGURE 2.

Figure 1:
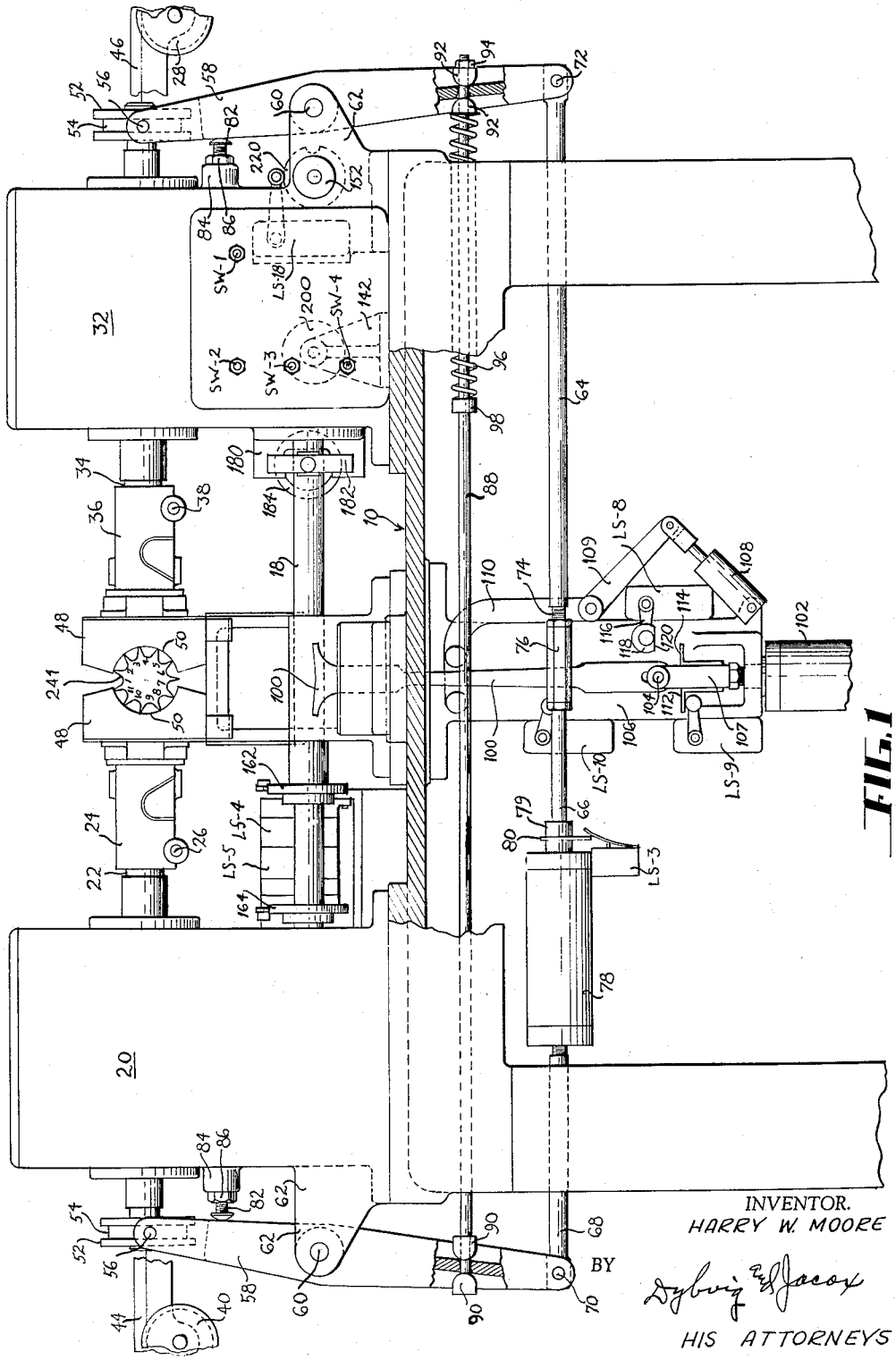

Referring to the drawings in detail, the coil winding machine of this invention is assembled upon a table illustrated by the reference numeral 10. As best seen in FIGURE 2, a hydraulic motor 12 is mounted upon the table 10 for the purpose of supplying hydraulic power to the coil winding machine. The motor 12 receives hydraulic power from a conventional hydraulic pump assembly not illustrated. The pump assembly may include any suitable hydraulic pump having sufficient capacity to operate the coil winding machine.

The pump and the motor 12 comprise a positive displacement hydraulic fluid system wherein mechanical power supplies to the pump is transmitted to the motor 12 through the fluid system. The motor 12 may be any suitable positive displacement hydraulic motor such as a vane or piston type motor.

A solenoid operated control valve illustrated at 13 in FIGURE 2 regulates the flow of fluid through a conduit 15 leading from the hydraulic pump to inlet conduits 17 and 19 for the motor 12 thence to an exhaust conduit 21. The control valve 13 has three operation positions. The first position connects the supply conduit 15 with the conduit 17 and the exhaust conduit 21 with the conduit 19. This connection causes the motor 12 to run in a forward direction. The second position connects the conduit 15 with the conduit 19 and the conduit 17 with the conduit 21. This reverses the direction of rotation of the motor 12.

The third position connects the conduit 15 with the conduit 21 and simultaneously closes both the conduits 17 and 19. Since the motor 12 is a positive displacement motor it cannot rotate when both ports are closed. The motor is therefore stopped and braked in this position. The control valve 13 thus is provided with forward, reverse, and stop positions. The control elements for operating this valve will be described in detail subsequently.

The motor 12 drives a pulley 14 which is operatively connected to a pulley 16 by means of a positive belt drive, not shown. The pulley 16 is non-rotatably secured to a shaft or spindle 18 extending across the table 10. The spindle 18 is journalled within parallel housings 20 and 32 mounted upon the table 10. A gear assembly, not illustrated, mounted within the housing 20 transmits the rotational movement of the spindle 18 in one to one ratio to a shaft 22 also journalled within the housing 20. Associated with the gear assembly in the housing 20 is a clutch enabling the spindle 18 to rotate independently of the shaft 22 and a brake for stopping the movement of the shaft 22.

Fixedly secured adjacent the end of the shaft 22 between the housings 20 and 32 is an element 24 supporting a flier 26. The shaft 22, element 24, and flier 26 are all tubular so that a wire strand may be fed over a pulley 28, illustrated in fragmentary detail to the right of FIGURE 2, through the tubular shaft 22, the element 24, and the body of the flier 26 to a pulley 30 carried at the end of the flier 26 for winding into a coil. Conventional means, not illustrated, are employed for supplying the wire to the flier 26 in a continuous manner under a predetermined tension for winding.

The housing 32 houses a gear assembly with an associated clutch and brake similar to that in the housing 20 for transmitting the rotary motion of the spindle 18 in one to one ratio to a shaft 34 journalled within the housing 32. The shafts 22 and 34 are rotated oppositely by their respective gear assemblies.

Fixedly secured adjacent the end of the shaft 34 between the housings 20 and 32 is an element 36 supporting a flier 38. The shaft 34, element 36, and flier 38 are all tubular so that a wire moving over a pulley 40, illustrated at the left of FIGURE 2, may be conveyed to a pulley 42 carried by the flier 38 for winding into a coil.

As is apparent in FIGURE 2, the fliers 26 and 38 are supported for rotation about a common axis in separate parallel planes and wire is fed to these fliers simultaneously over the pulleys 40 and 28, supported by brackets 44 and 46, respectively. The arrangement is such that the two fliers may be employed to simultaneously wind two separate coils.

The shafts 22 and 34 which are driven rotatably by the spindle 18 are also mounted for reciprocating axial motion such that these shafts may move one toward the other and one away from another. Between the housings 20 and 32 these shafts each support a chuck member 48. These chuck members 48, which are rotatably mounted upon the shafts 22 and 34, are provided with arcuate inner portions 50 such that they may co-operatively engage a cylindrical armature.

With this arrangement, an armature may be gripped between the chuck members 48 by applying axial force upon the shafts 22 and 34. A sleeve 49 mounted upon a housing 130 and projecting toward the chuck members 48 receives the shaft of the armature which is to be wound when positioned between the chuck members 48. This sleeve prevents rotation of the armature and the chuck members engaged therewith about the axis of the shafts 22 and 34, but does not restrain rotation of the armature about its own axis.

The chuck members 48 are actuated one toward the other so as to grip an armature by the following mechanism. Each of the shafts 22 and 34 terminates at its outer end in a cylindrical member 52 provided with an annular groove 54. Pins 56 associated with yoke members 58 travel in the grooves 54 of the cylindrical members 52. The arrangement is such that the shafts 22 and 34 are free to rotate independently of the yoke members 58 but that the yoke members 58 may be utilized to actuate the shafts 22 and 34 axially. The yoke members 58 which are best illustrated in FIGURE 3 are journalled for pivotal movement at substantially their midpoint upon shafts 60 secured between bracket members 62 associated with the respective housings 20 and 32. A shaft formed of segments 64, 66 and 68 joins the free ends of the yoke members 58, this shaft passing under the supporting table 10.

Segment 68 of this shaft is pivotally secured to one yoke member 58 by a pin 70. Segment 64 of this shaft is pivotally secured to the opposite yoke member 58 by a pin 72. Segment 64 terminates in a threaded portion 74 threadedly engaging a sleeve 76 which is rotatably secured to the segment 66. The arrangement is such that manual rotation of the sleeve 76 may be employed for adjusting the overall length of the shaft interconnecting the yoke members 58. The segments 66 and 68 are connected together by an extensible air cylinder 78. The air cylinder 78 is used to expand the overall length of the shaft which interconnects the yoke members 58 or to contract the overall length of this shaft. The plunger 79 of the air cylinder 78 which engages segment 66 is provided with a finger 80 adapted to actuate a microswitch, designated by the reference numeral LS–3, carried by the main body portion of the air cylinder 78. The arrangement is such that, when the air cylinder 78 extends, contact is made within the switch LS–3 and, when the air cylinder contracts, contact is broken with the switch LS–3.

Extension of the air cylinder 78 is limited by stop members 82 co-operating with the yoke members 58. These stop members 82 threadedly engage bosses 84 integral with the housings 20 and 32 above the table member 10 and are locked in a fixed position by means of nuts 86. The arrangement is such that the chuck members 48 can be driven one toward another to grip an armature of given diameter, but cannot be driven into direct contact one with the other.

In addition to the air cylinder 78 which is employed for moving the chuck members 48 one toward another and for moving these chuck members 48 one away from another, spring means are employed biasing the chuck members one toward another. To this end a shaft 88 parallel to the extensible segmented shaft described above interconnects the yoke members 58 beneath the table 10. Ferrules 90 at the left end of this shaft, as viewed in FIGURE 1, are fixedly secured in spaced relation on this shaft such that the shaft 88 is pivotally secured to the associated yoke member 58 but is incapable of moving axially relative to this yoke member 58. Ferrules 92 slidably engage the shaft 88 on opposite sides of the yoke member 58 which is to the right as viewed in FIGURE 1. Thus, this yoke member 58 is free to execute pivotal motion independently of the shaft 88. This pivotal motion is limited by a nut 94 threadedly engaging the end of the shaft 88 at the right as viewed in FIGURE 1. The right yoke member 58 is biased outwardly of the shaft 88 by means of a coil spring 96 abutting a shoulder 98 secured to the shaft 88. The arrangement is such that the spring 96 operates to bias the chuck members 48 one toward another at all times.

The operation of this chuck assembly is as follows. Initially when it is desired to insert an armature between the chuck members 48 the air cylinder 78 is contracted overriding the spring 96 to draw the chuck members 48 apart. Upon the armature being inserted between the chuck members 48, the air cylinder 78 is expanded to bring the chuck members 48 into compressive engagement with the armature. The switch LS–3 provides a signal indicating that an armature has been gripped by the chuck members 48. By a means to be described in the following, the armature which is gripped by the chuck members 48 is periodically rotated within the chuck members 48 about its own axis. To accomplish this rotation it is necessary to relieve the compressive force with which the chuck members 48 engage the armature. This is accomplished by neutralizing the air pressure within the air cylinder 78 without contracting the air cylinder. When the pressure is neutralized the spring 96 takes over the burden of maintaining the chuck members 48 in compressive engagement with the supported armature. This reduced compressive force is not so great that the armature cannot be rotated between the chucks 48 without damage to the armature. When the armature has been rotated the desired amount, the air cylinder 78 is once again energized to drive the chuck members 48 together and to reassume the duty of maintaining these chuck members in compressive engagement with the supported armature.

The armature supported by the chuck members 48 is rotated between these chuck members by the following mechanism, which is best illustrated in FIGURE 1. The mechanism includes a stinger 100 which is adapted to be actuated vertically through the surface of the table 10 by an air cylinder 102 supported by a bracket 106 secured to the underside of this table 10. The stinger 100 is pivotally secured to the plunger 107 of the air cylinder 102 by means of a shaft 104. An air cylinder 108 pivotally secured to the bracket 106 operates through a linkage comprising members 109 and 110 to actuate the stinger 100 to the left or to the right as viewed in FIGURE 1. The arrangement is such that upon the air cylinder 108 being retracted and the air cylinder 102 being extended to move the stinger upwardly, the stinger 100 will engage the chuck member 48 which is to the right as viewed in FIGURE 1. Correspondingly, upon the air cylinder 108 being extended and the air cylinder 102 being also extended to elevate the stinger 100 the stinger will move into engagement with the chuck member 48 which is to the left as viewed in FIGURE 1.

A pawl assembly is provided in each chuck member 48 for the purpose of rotating the armature secured thereby. These pawl assemblies have been described in detail in United States Letters Patent No. 2,670,145 issued February 23, 1954 to J. M. Biddison and for this reason are only briefly described herein. The pawl assembly in each chuck member 48 is so constructed that upon actuation by the stinger 100 the pawl assembly will engage a slot of the armature and rotate the armature through an angle corresponding to the central angle between adjacent slots in the armature. The construction is such that when the air cylinder 108 is extended such that the stinger 100 has been pivoted to the left as viewed in FIGURE 1 the armature is actuated in a clockwise direction. Conversely, when the air cylinder 108 is contracted the armature will be actuated in the counterclockwise direction.

There are three control elements associated with the stinger assembly as illustrated in FIGURE 1. The first of these control elements is a switch LS-9 adapted to be actuated by an arm 112 carried by the plunger 107 of the air cylinder 102. When the air cylinder 102 is contracted such that the stinger 100 is in its home position, switch LS-9 is actuated so as to make contact. Upon the air cylinder 102 being extended so as to elevate the stinger 100, pressure on switch LS-9 is removed. The switch LS-9 operates a solenoid valve in the air supply for the air cylinder 78 neutralizing the air pressure in this air cylinder to partially relieve the gripping pressure of the chuck members 48. When the stinger 100 has been elevated fully into engagement with one of the chuck members 48, the arm 112 engages a second switch LS-10. This switch LS-10 makes contact when actuated by the arm 112 and breaks contact when the stinger 100 returns to its home position. As the stinger 100 returns to its home position, an arm 114 carried by the plunger 107 of the air cylinder 102 actuates a third switch LS-8.

The switch LS-8 is designed to operate as a flipper switch. To this end the switch LS-8 is provided with an arm 116 supporting a wheel 118 having a flattened peripheral portion 120. Spring means, not shown, bias this wheel 118 so as to maintain the flattened portion 120 thereof normally horizontal. As the stinger 100 is elevated by the air cylinder 102 the arm 114 strikes the flattened portion of the wheel 118 and merely rotates this wheel without actuating or moving the arm 116. Upon downward movement of the stinger 100, the arm 114 now engages the unflattened periphery of the wheel 118 and succeeds in actuating the switch arm 116 so as to briefly actuate the switch LS-8. Thus, upon upward movement of the stinger 100, switch LS-8 is not actuated. However, upon downward movement of the stinger 100 switch LS-8 is actuated to make contact. When the stinger 100 has fully returned pressure is restored on the switch LS-9 restoring pressure in the air cylinder 78. The functional operation of switches LS-8, LS-9, and LS-10 will be described in greater detail subsequently.

In the foregoing, the means, generally, for supporting an armature for winding coils onto the armature and for rotating or indexing the armature have been described. As the armature is wound it is necessary to provide leads to the coils wound into the various slots of the armature. To accomplish this, a lead pull hook, not shown, is projected into the path of the wire being wound to form the first turn of each coil in a new armature slot. Thus, the first turn of each coil is wound partly outside the armature onto the lead pull hook. In the present device, lead pull hooks are provided for each flier. Where a two coil per slot armature is to be wound two lead pull hooks are used in association with each flier, one of these hooks being adapted to pull a short lead and the other a long lead. This provides a means for distinguishing the leads from the two coils wound in each slot. In the present coil winding machine, the lead pull mechanism, including the lead pull hooks, is contained within the housing 130 situated about the spindle 18 upon the table 10 between the fliers 26 and 38. This lead pull mechanism is not illustrated in detail herein, for the reason that the lead pull mechanism has been adequately described in United States Letters Patent No. 2,670,145 issued February 23, 1954 to J. M. Biddison. A single control element not shown is associated with the lead pull mechanism. When a lead pull hook has been extended so as to pull a lead, pressure on a switch LS-11 within the housing 130 is released. The function of this switch LS-11 will be described in detail in connection with the sequential operation of the coil winding machine.

In the foregoing, the elements essential for the winding of coils onto an armature have been described. In the following the various control elements which combine to operate the coil winding machine in the proper sequence will be described.

The principle control elements other than the control elements LS-3 and LS-9 through 11, which have been described previously, are mounted on three cam lines. The first of these cam lines is provided by the spindle 18 which rotates in one to one synchronism with the fliers 26 and 38. The second of these cam lines is provided by a shaft 140 driven from within the housing 32 through a suitable gear assembly. The gear assembly, not shown, is arranged so that the shaft 140 executes 360° of rotation during the time that a single coil is wound by the fliers 26 and/or 38. For example, when the flier 38 winds one coil, the shaft 140 moves through 360° of rotation and when the flier 38 winds a successive coil the shaft 140 rotates through an additional 360° of rotation. It follows that if coils of ten turns each are to be wound the gear ratio between the spindle 18 and the shaft 140 will be ten to one. The shaft 140 is supported for rotation by journals 142 and 144, the latter being illustrated in FIGURE 2a.

The third cam line is provided by a shaft 146 extending from front to rear along the left end of the table 10 as viewed in FIGURE 2. This shaft is journalled upon journals 148 and 150 which project from the side of the table 10. The end of the shaft 146 which projects to the front of the coil winding machine, is provided with a hand knob 152 by means of which the shaft may be manually preset to a given rotary position. The opposite end of this shaft 146 is provided with a ratchet 154 operatively connected to the shaft 140 by means of a pawl element 156. The number of teeth in the ratchet element 154 is made to correspond to four times the number of slots in the periphery of the armature which is to be wound. The pawl element 156 is designed for actuation by the shaft 140 once each 360° of rotation of the latter. Accordingly, the shaft 146 will rotate an angle equivalent to one-half the central angle between adjacent armature slots each time the shaft 140 executes 720° of rotation corresponding to the winding of two successive coils. Thus, when two successive coils are to be wound in each armature slot, the shaft 146 rotates half as far as the armature.

The control elements operated by these cam lines are as follows. The spindle 18 carries three cams 162, 164 and 166. Cam 162 operates a switch LS–4; cam 164 operates a switch LS–5 and cam 166 operates a switch LS–6. The switches LS–4, LS–5 and LS–6 may be described generally as position control switches for positioning the fliers 26 and 38 at specified angular orientations for stopping and starting. Since these position control switches are used only at specified times, and must be inoperative during the time that a coil is actually being continuously wound by the fliers it is desirable to move the switches LS–4, LS–5 and LS–6 to inoperative positions at these times to conserve on mechanical wear of the switches. To this end the switches LS–4, LS–5 and LS–6 are mounted upon a plate 170 which is pivotally joined to a bracket 172 fixedly mounted to the table 10. Pivotal movement of the plate 170 is regulated by an air cylinder 174 best illustrated in FIGURE 5. When the air cylinder 174 is extended the switches LS–4, LS–5 and LS–6 are separated from the cams 162, 164 and 166. When the air cylinder 174 is contracted these switches are brought into operative engagement with their respective cams.

The control elements or switches LS–4, LS–5 and LS–6 have been designated position control switches. That is, it is these switches which determine the exact positions of stopping and starting the fliers 26 and 38. During ordinary run operation of the machine, the switch LS–5 is used for stopping rotation of the fliers. When switch LS–5 has been actuated by its cam 164, switch LS–5 operates the solenoid control valve 13 in the hydraulic system which simultaneously obstructs the fluid inlet and fluid outlet of the motor 12. The motor 12 being a positive displacement motor is therefore immediately stopped and locked by the closed fluid system.

Ordinarily, the operation of the switch LS–5 is sufficiently precise that an auxiliary positioning means is not required. However, to guarantee the exact stopping of the fliers 26 and 38 an auxiliary positioning means is provided for operation in conjunction with the switch LS–5. This auxiliary positioning means is best illustrated in FIGURES 2 and 4. Referring to FIGURE 4, the positioning means comprises a circular cam 180 notched throughout 180° of its peripheral surface, and a cam actuator 182 having a cylindrical recess adapted to engage the notched portion of the cam 180. The actuator 182 is operated reciprocally by an air cylinder 184 triggered by the switch LS–9, as will be described in greater detail subsequently. As best illustrated in FIGURE 2, the air cylinder 184 is supported by a bracket 186 mounted upon the housing 32.

This auxiliary positioning device operates as follows. In setting up the machine for operation, the cam 180 is positioned on the spindle 18 such that when the fliers 26 and 38 are in their desired stopping position, the flat surfaces 181 formed by the notched portion of the cam are oriented vertical with respect to the surface of the table 10. This position is illustrated in FIGURE 4. After the machine is put into operation, and the fliers 26 and 38 are stopped by operation of the switch LS–5, the flat surfaces 181 of the cam 180 may or may not be oriented vertically depending upon the exact position at which the switch LS–5 is set to operate. The air cylinder 184 having been triggered by the switch LS–9, drives the cam actuator 182 toward the cam 180. As the cam actuator 182 is brought into engagement with the cam 180 a pin 188 carried by this cam actuator engages the arm 190 of a switch designated by the reference numeral LS–31. This switch LS–31 operates a solenoid valve, not shown, in the fluid system for the motor 12 providing a bypass across the fluid inlet and outlet of the motor 12. This bypass permits adjustment of the cam 180, and consequently the spindle 18, by the cam actuator 182. This operation accurately positions the fliers 26 and 38.

It was noted hereinbefore, that the shaft 140 rotates 360° with the formation of each coil and rotates 720° with the formation of each pair of coils successively wound by the fliers 26 and/or 38. Secured to this shaft 140 are cam elements 200 and 202 adapted to actuate switch elements LS–7 and LS–19, respectively. As will be described in greater detail hereinafter, the switch LS–7 is employed for the general purpose of setting up the switches LS–4, LS–5 and LS–6 for stopping the rotation of the fliers 26 and 38 when a coil has been fully wound by these fliers. The switch LS–19 prepares for an indexing of the armature to a new position after the winding of a coil by the fliers.

The shaft 140 also carries a cam 204 illustrated in FIGURE 2a. Associated with the cam 204 is a cam follower 206 pivotally supported by a bracket 208 integral with the journal 144 supporting the shaft 140 for rotation. The cam follower 206 regulates the operation of a throttle valve indicated generally at 210 which governs the flow of fluid in the hydraulic lines to the motor 12. The cam follower 206 has the function of varying the speed of operation of the hydraulic motor 12 during the time that the coil is being wound by the fliers 26 and 38. In the ordinary course of operation of the coil winding machine, the fliers 26 and 38 are rotated at first slowly when the winding of a coil is commenced. After one of two turns of the coil have been wound, the throttle 210 is employed to speed up the operation of the motor 12 to a maximum value. After all but a few turns of the coil have been wound, the cam follower 206 is actuated by the cam 204 to slow the hydraulic motor 12 so that when the fliers 26 and 38 are winding the last turn of the coil they are traveling very slowly. This enables the solenoid control valve operated by the switch LS–5 to operate without absorbing an excessive momentum.

This is an important feature of the present invention for the reason that the ease with which the direction and speed of operation of the hydraulic motor 12 may be varied during the winding of a coil results in a considerable simplication in the clutch and power transmission mechanisms for the driven shafts 22 and 34 and further results in simplication in the controls which carry the coil winding machine through the entire sequence of operations involved in winding a coil. In an electro-mechanical drive there is ordinarily very little control over the speed of operation of the fliers 26 and 38 and accordingly the clutch and brake mechanisms for starting and stopping the fliers and the means by which power is transmitted to these fliers necessitates complex position control elements.

As noted hereinbefore, the shaft 146 rotates in general synchronism with the armature supported between the chuck members 48. However, the shaft 146 receives one rotational impulse for each coil wound by the fliers. The shaft 146 carries cam elements designated by the reference numerals 220, 222, 224, 226, 228, 230 and 232. These cam elements actuate switches designated LS–18, LS–21, LS–22, LS–30, LS–32, LS–33 and LS–34, respectively. The switches LS–32, LS–33 and LS–34 are auxiliary switches not used in the ordinary operation of the coil winding machine and are provided in the machine as extra control elements to provide for the contingency that additional control elements may be needed for special types of winding. The cam elements 220, 222, 224 and 226 and the associated switch elements LS–18, LS–21, LS–22 and LS–30 are used generally to vary the regulation of the coil winding machine at its winds successive coils in the armature and for stopping the operation of the coil winding machine when the armature has been fully wound. Since two or more armatures will be wound during the time these cam elements complete a single revolution, their cam surfaces repeat along the periphery.

An indexing detent is employed for restricting the angular positions which can be assumed by the shaft 146. This indexing detent comprises a notched element 234 mounted on the shaft 146 and a spring loaded detent 236 seated in a support 240 anchored to the journal 150 supporting one end of the shaft 146 for rotation. This detent mechanism assists in manually positioning the shaft 146 with the manual control knob 152 and further co-operates with the pawl element 156, which transfers rotation from the shaft 140 to the shaft 146, to accurately position the shaft 146 at all times.

In addition to the controls described above, four manually operated switches labeled SW-1, SW-2, SW-3 and SW-4 are provided on a control panel positioned to the front of the housing 32 mounted upon the table 10. Switches SW-2, SW-3 and SW-4 are two position power switches for energizing the hydraulic pump, for actuating the air supply to the air cylinders associated with the coil winding machine, and for supplying electrical energy to the coil winding machine. Switch SW-1 is a two position switch which is spring biased to one of its two positions. This switch is used for initiating the operation of the coil winding machine to wind an armature. To this end the switch is manually depressed to initiate winding of the machine and after having been held manually in the depressed position for a predetermined period of time may be released without stopping the coil winding machine.

Switch SW-1 has been designed to operate in this manner so that it may be conveniently replaced by a pressure operated switch triggered by a housing for the coil winding machine. The coil winding machine is preferably supplied with a pivotal safety cover or housing, not shown, so that when the coil winding machine is in operation an operator cannot get his hands into the working mechanism. When such a cover is provided, the operation of the coil winding machine is initiated when the operator lowers the safety cover into position. Lowering the safety cover into position actuates a modified switch SW-1 and, after the safety cover has been held in closed position a predetermined time indicating that start up of the coil winding machine was a conscious act rather than an accident, reelase of pressure on the safety housing will not interrupt the operation of the coil winding machine. A suitable interlock, not illustrated, may be utilized to lock the safety cover in position once the predetermined time has lapsed so that the safety cover cannot accidentally be opened.

Figure 6:
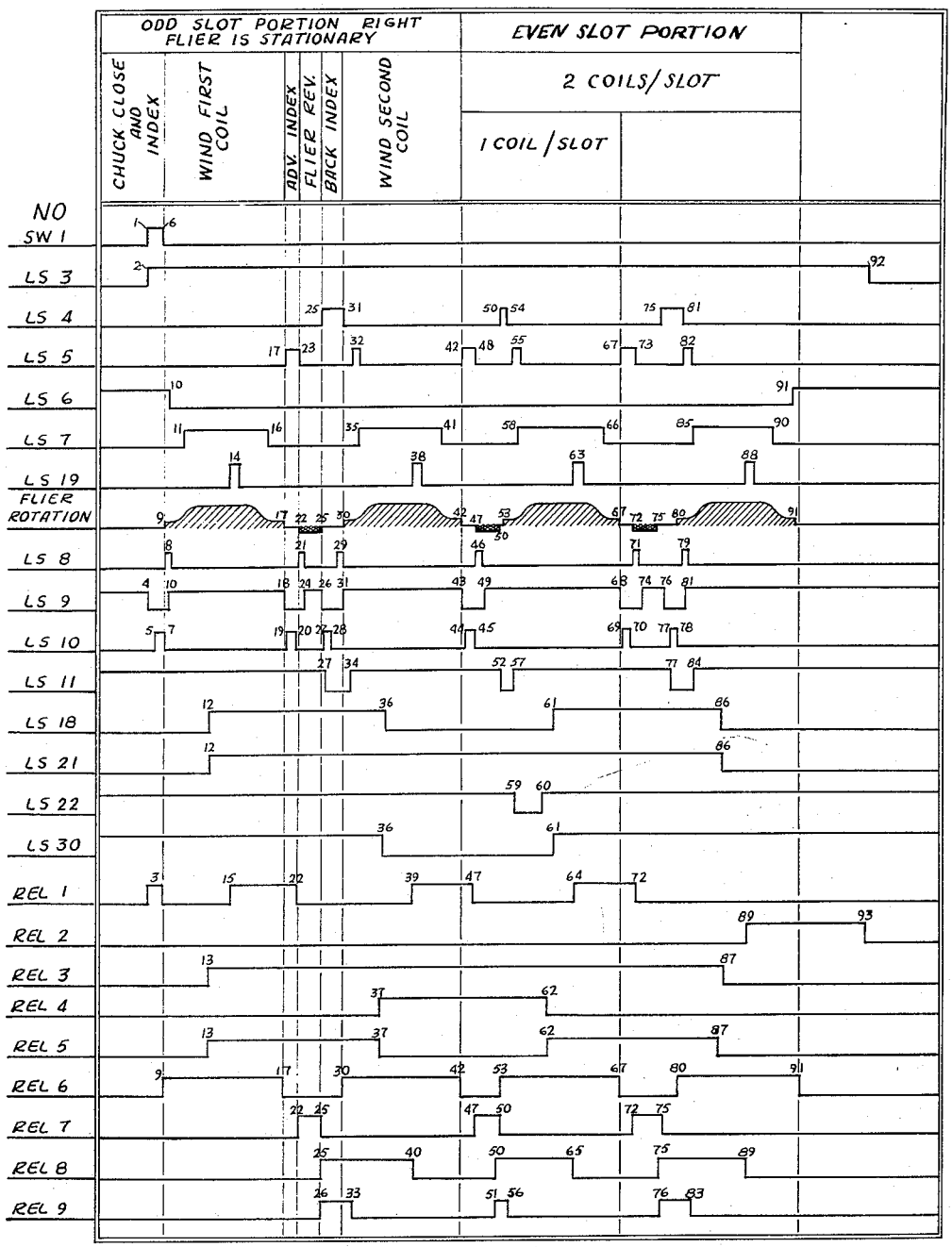
FIGURE 6 is a cycle-gram illustrating the co-operative action of the various control elements associated with the coil winding machine of FIGURE 1.

FIGURE 6 is a cycle-gram illustrating the entire sequential operation of the coil winding machine in winding coils onto an armature. In FIGURE 1 an odd slot armature 241 having eleven slots in the periphery thereof has been illustrated between the chuck members 48. The slots in this armature have been numbered one to eleven in the clockwise direction with slot 1 being in the uppermost position, between the chuck members 48.

The general scheme for winding an armature is as follows. Referring to FIGURE 1, initially the flier 38 to the right as viewed in FIGURE 1 is held stationary while the flier 26 to the left of FIGURE 1 is rotated to wind a coil in slots 1 and 7. Where two coils per slot are to be wound, the flier 38 is stopped and the armature is indexed in the counterclockwise (advance) direction to bring slot 2 to the top as viewed in FIGURE 1. Then the flier 38 is rotated through less than one revolution in the reverse direction to loop a strand of wire into slot 2. When the flier 38 has travelled across slot 2, the armature is indexed in the clockwise (reverse) direction to return slot 1 to the top. With the loop of wire thus segregated into slot 2, the flier 38 is once again rotated to wind a second coil in the slot pair comprising slots 1 and 7. When this second coil has been completed, the armature has been provided with what is known in the trade as the odd slot coil.

Thereafter, the armature is indexed to bring slot 2 to the top as viewed in FIGURE 1. Both fliers 26 and 38 are then placed into operation with the flier 38 winding a coil in slots 2 and 8 and the flier 26 winding a coil in slots 2 and 7. The flier 26 rotates in a direction opposite to that of the flier 38.

When a coil has thus been wound by each of the fliers, which operate simultaneously, the armature is indexed in the counterclockwise direction to bring slot 3 to the top as viewed in FIGURE 1. The fliers 26 and 38 are then both reversed from their normal run direction with the flier 38 placing a loop in slot 3 and the flier 26 placing a loop in slot 8. Thereafter, the armature is returned in the clockwise direction to replace slot 2 at the top as viewed in FIGURE 1 and the fliers 26 and 38 are rotated in their normal run directions to wind additional coils in the slot pairs. That is, flier 38 winds an additional coil in slots 2 and 8 and flier 26 winds an additional coil in slots 2 and 7. This sequence, with both fliers rotating, is repeated with slot 3 at the top, slot 4 at the top, slot 5 at the top, and slot 6 at the top. The winding of the armature is then complete.

If, instead, an even slot armature, having ten slots for example, were to be wound the operation would be as follows. With both fliers operating a coil would be wound in slots 1 and 7 while simultaneously a coil is wound in slots 2 and 6. Then the flier would be indexed and a coil wound in slots 2 and 8 while simultaneously a coil is wound in slots 3 and 7. Next, the armature is indexed and a coil is wound in slots 3 and 9 while simultaneously a coil is wound in slots 4 and 8. The armature is again indexed and a coil is wound in slots 4 and 10 while simultaneously a coil is wound in slots 5 and 9. Finally, the armature is indexed and a coil is wound in slots 5 and 1 and simultaneously in slots 6 and 10. This would complete the winding of a ten slot armature with one coil in each slot. If it were desired to wind the ten slot armature with two coils in each slot the same pattern for winding would be used except that after one pair of coils had been wound by the two fliers operating simultaneously, the armature would be advanced, the fliers reversed, then the armature returned as described hereinbefore to segregate loops of the successively wound coils into adjacent slots of the armature.

It is apparent that the winding of even slot armatures and odd slot armatures is substantially the same insofar as the sequential operation of the machine is concerned except that in the case of even slot armatures the odd slot winding operation is omitted. Similarly, only a slight change in the sequential operation of the machine is required to wind two coils per slot or one coil per slot on the armature. Obviously, a coil winding machine capable of winding two coils per slot on an odd slot armature is capable of performing all of the other types of winding discussed above. For this reason, the cycle-gram of FIGURE 6 is confined primarily to the operation of the coil winding machine in winding odd slot armatures with two coils per slot.

Referring to the cycle-gram, there is shown to the left of FIGURE 6, in a vertical column, all of the essential control elements for the coil winding machine. In addition, there are shown nine relays, the operation of which will be described in the following. Associated with each of the switches and relays is a horizontal line of discretely changing elevation indicating when the associated switch is under pressure or off pressure or the associated relay is energized or deenergized. The cycle-gram is based upon a time axis such that the extreme left of FIGURE 6 indicates the condition of the various switches and relays at the time the machine is initially started, and the extreme right of FIGURE 6 illustrates the condition of the switches and relays at the time the coil winding machine has completed the winding of coils onto an armature. To facilitate interpretation of the information placed on the cycle-gram, a horizontal row indicating the nature of the flier rotation throughout the sequence of operations has been provided. In this row, the elevation of the line signifies the velocity of flier rotation. The singly hatched areas indicate flier rotation in the ordinary run direction and the doubly hatched areas indicate flier rotation in the reverse direction.

It is to be noted that switches LS–6, LS–9, LS–22 and LS–30 are under pressure at the initiation and completion of operation of the coil winding machine. The remaining switches are off pressure.

The terms "under pressure" and "off pressure" merely signify a shift in a double throw switch. Since the switches may have several contacts, some of which are made when the switch is under pressure while the others are broken when the switch is under pressure, notation that a switch is under pressure does not necessarily indicate whether contact in a particular circuit is made or broken.

Across the top of the cycle-gram, the basic operations performed by the coil winding machine as it moves through its sequence of operations are identified. The operation of the coil winding machine is generally divisible in two portions, one portion for producing the odd slot winding, and the other portion for producing a two coil per slot winding after the odd slot winding has been made. A subdivision under the odd slot portion indicates the chuck closing (armature gripping) and an initial indexing operation. Another subdivision indicates the events occurring while the first coil is wound. Another subdivision indicates the events occurring as the armature is advanced one slot. Another subdivision indicates the events occurring as the flier is reversed. Another subdivision indicates the events occurring as the armature is retracted one slot to return the armature to its original position. The last subdivision in point of time under the odd slot portion indicates the events occurring as the second coil is wound. The two coils per slot portion of the cycle-gram is subdivided into a one coil per slot operation. The cycle-gram illustrates ninety-three basic events occurring in the sequential winding of an odd slot armature with two coils per slot. These events are described in the following.

Event 1: An operator depresses and holds switch SW–1 under pressure after having placed an armature between the chuck members 48. In response, air cylinder 78 is energized to close the chuck members 48 and a brake, not shown, is applied to the right flier 26. Simultaneously a clutch associated with the right flier 26 is disengaged so that the right flier may remain stationary as the spindle 18 is rotated.

Event 2: As the air cylinder 78 extends switch LS–3 is moved under pressure.

Event 3: Switch LS–3 actuates relay 1. Relay 1 operates air cylinders 102 and 108 to give an advance index extend. That is, the stinger 100 is actuated upwardly into engagement with the chuck members 48, to the left as viewed in FIGURE 1, resulting in counterclockwise rotation of the armature through one slot. This insures that the armature is properly aligned in the chuck members.

Event 4: As the stinger 100 rises, pressure is removed from the switch LS–9, causing neutralization of the air cylinder 78 to thereby partially release pressure in the chuck members 48.

Event 5: With the stinger 100 fully extended, switch LS–10 is placed under pressure.

Event 6: The coil winding machine will remain in this condition until the operator releases pressure on switch SW–1.

Event 7: Releasing pressure from switch SW–1 closes a circuit including switch LS–10. Switch LS–10 returns air cylinder 102 to retract the stinger 100.

Event 8: Upon retraction of the stinger 100, the flipper switch LS–8 is actuated. (In the cycle-gram the actuation of switch LS–8 is indicated as extending over a period of time. This is for convenience in showing that the switch LS–8 is actuated, for in actuality the switch LS–8 is actuated for only a brief instant.)

Event 9: With the actuation of switch LS–8 relay 1 is deenergized and relay 6 is energized. Relay 6 operates the solenoid control valve for the motor 12 such that the motor 12 is placed into normal rotation to drive the flier 38 in its normal forward direction. The row illustrating flier rotation in the cycle-gram indicates that the flier originally starts at a low forward speed.

Event 10: As the hydraulic motor 12 is being placed into operation, the stinger 100 is returning to apply pressure to the switch LS–9. Switch LS–9 restores pressure in the air cylinder 78. At substantially the same time the initial rotation of the spindle 18 has brought switch LS–6 from under pressure through rotation of the cam element 166 mounted on the spindle 18. As will appear more fully in the following, switch LS–6 is used for the sole purpose of stopping the coil winding machine when an armature has been completely wound. Accordingly, cam 166 was necessarily in position to actuate switch LS–6 when operation of the machine was stopped upon winding a previous armature and would therefore be in this position when winding of the present armature was commenced.

Event 11: With the shaft 140 rotating as the flier 38 rotates, the cam follower 206 is displaced to increase the speed of operation of the hydraulic motor 12 and thereby the speed of operation of the flier 38. At the same time, switch LS–7 on the shaft 140 is placed under pressure as a result of rotation of the cam element 200. Switch LS–7 energizes air cylinder 174 to disengage switches LS–4, LS–5 and LS–6 from their respective cam elements.

Event 12: As this first coil is being wound the shaft 146 is rotated through one notch of the ratchet 154 by operation of the pawl element 156. With this rotation cam elements 220 and 222 are rotated so as to apply pressure to the switches LS–18 and LS–21, respectively.

Event 13: Switch LS–18 energizes relay 5; switch LS–21 energizes relay 3. Relay 5 sets up the lead pull mechanism 130 for pulling a long lead. Relay 3 is a holding relay, holding the operation of the coil winding machine in cyclic operation.

Event 14: Cam 202 on shaft 140 briefly actuates switch LS–19.

Event 15: Switch LS–19 energizes relay 1, which holds, preparing for indexing of the armature when this first coil is completed.

Event 16: Cam 204 on shaft 140 actuates the cam follower 206 to throttle the hydraulic motor 12, thus slowing the speed of rotation of the flier 38. Simultaneously, switch LS–7 goes off pressure through rotation of the cam element 200.

Event 17: Braking the contact in switch LS–7 permits deenergization of air cylinder 174 replacing the switches LS–4, LS–5 and LS–6 in contact with their respective cam elements. Almost simultaneously cam element 164 places pressure on switch LS–5 deenergizing relay 6, thereby causing the solenoid control to stop the motor 12. The machine stops its rotation.

Event 18: With relay 6 deenergized and relay 1 having set up for an advance indexing of the armature, the stinger 100 is elevated by the air cylinder 102 to rotate the armature a distance, corresponding to one slot, in the counterclockwise direction. As the stinger 100 elevates pressure on the switch LS–9 is removed, neutralizing air cylinder 78.

Event 19: When the stinger 100 reaches its maximum upward movement switch LS–10 is placed under pressure causing a return of the stinger 100 to its home position.

Event 20: As the stinger 100 returns, it releases switch LS-10 from under pressure.

Event 21: On its return stroke, the stinger 100 actuates switch LS-8.

Event 22: With actuation of switch LS-8, relay 1 is deenergized. Simultaneously, relay 7 is energized. (Referring back to Event 9, it is to be noted that actuation of switch LS-8 had previously deactuated relay 1 and actuated relay 6. Here actuation of switch LS-8 deactuates relay 1, but actuates relay 7 instead of relay 6. This change in operation is brought about by having switch LS-5 under pressure where formerly, when Event 9 occurred, the switch LS-5 was off pressure.) Relay 7 operates the solenoid control valve to bring about reverse rotation of the hydraulic motor 12, and therefore reverse rotation of the flier 38.

Event 23: As the flier 38 moves in reverse, cam element 164 rotates so as to bring switch LS-5 off pressure.

Event 24: The stinger 100 returning to its home position, puts switch LS-9 under pressure restoring pressure to the air cylinder 78.

Event 25: With continuing reverse rotation of the flier 38, cam element 162 on the shaft 18 moves switch LS-4 under pressure. Switch LS-4 deenergizes the relay 7 stopping the reverse rotation of the machine. Switch LS-4 also energizes relay 8.

Event 26: Relay 8 functions to set up the lead mechanism for a lead pull. Relay 8 in setting up energizes a relay 9. Relay 9 causes a lead hook to extend for a lead pull and holds through switch LS-5. (Recall that relay 5 had set up the lead mechanism so that a long lead would be pulled in Event 13.) The lead hook is held in its outward position by the relay 9.

Relay 7 as it is deenergized actuates the air cylinders 102 and 108 for a back indexing of the armature held by the chuck members 48. That is, the stinger 100 is brought into engagement with the chuck member to the left as viewed in FIGURE 1 so as to rotate the armature in the clockwise direction.

Event 27: The lead hook extending from the lead mechanism 130 releases pressure on switch LS-11 associated with this lead mechanism. At this time switch LS-11 is inactive. The function of this switch will be described subsequently.

Event 28: The stinger 100 returning from the back indexing of the armature releases pressure from the switch LS-10.

Event 29: During the return stroke of stinger 100 actuates switch LS-8.

Event 30: Switch LS-8 energizes relay 6 which operates the solenoid control valve to start the motor 12 in its normal forward operation. (Referring to the Events 9 and 22, the energization of relay 6, rather than relay 7, in the present event is brought about by the fact that in the present event, switch LS-5 is off pressure.)

Event 31: As the flier 38 proceeds to rotate in the normal run direction, switch LS-4 is brought under pressure by cam element 162. At approximately the same time the stinger 100 returns to its home position placing the switch LS-9 under pressure to restore pressure to the air cylinder 78.

Event 32: The flier 38 now moving in its normal forward direction, cam element 164 once again applies pressure to the switch LS-5.

Event 33: A contact on switch LS-5 functions to deenergize relay 9.

Event 34: With relay 9 denergized, the lead hook returns to its normal position, that is, the lead hook which has pulled a long lead is returned to a position within the housing for the lead mechanism 130. This places the switch LS-11 once again under pressure.

Event 35: With the flier 38 continuing rotation and therefore with the shaft 140 continuing rotation, the cam element 204 actuates the cam follower 206 associated with the throttle valve accelerating the machine in maximum speed forward run. Simultaneously, the cam element 200 places switch LS-7 under pressure, thereby actuating the air cylinder 174 to disengage the switches LS-4, LS-5 and LS-6 from their respective cams.

Event 36: As this second coil is being wound, the shaft 146 is actuated by the pawl element 156 though a distance corresponding to one notch on the ratchet wheel 154. With this movement of the shaft 146, cam elements 220 and 226 place the switches LS-18 and LS-30 off pressure.

Event 37: Switch LS-18 off pressure causes relay 5 to be deenergized. Simultaneously, switch LS-30 off pressure permits relay 4 to energize. Deenergizing relay 5 and energizing relay 4 prepares the lead mechanism for pulling a short lead after this second coil has been wound.

Event 38: With continuing rotation of the shaft 140, the cam element 202 carried by this shaft briefly actuates the switch LS-19.

Event 39: The brief actuation of switch LS-19 causes relay 1 to energize and hold.

Event 40: Relay 1 energized causes deenergization of relay 8. Also, relay 1 energized prepares for indexing of the armature to the next slot after these first two coils have been wound. Deenergizing relay 8 holds the lead pull mechanism inactive while the armature is being indexed to the next position.

Event 41: With continued rotation of the flier 38, the shaft 140 approaches the end of a revolution. The cam element 204 carried by this shaft actuates the cam follower 206 regulating the throttle valve to slow down the speed of rotation of the flier 38. Simultaneously, the cam element 200 places the switch LS-7 off pressure. This deenergizes the air cylinder 174 permitting the switches LS-4, LS-5 and LS-6 to reengage their respective cams.

Event 42: The flier 38 is now in its final turn preparatory to stopping rotation. The cam element 164 on the spindle 18 places the switch LS-5 under pressure. This deenergizes relay 6 stopping the forward rotation of the hydraulic motor 12.

Event 43: With relay 6 deenergized and relay 1 energized, the air cylinders 102 and 108 are actuated to elevate the stinger 100 to rotate the armature in the counterclockwise direction. This takes pressure off the switch LS-9, neutralizing air cylinder 78.

Event 44: With the stinger 100 fully elevated, the switch LS-10 is brought under pressure. The switch LS-10 energizes the air cylinder 102 in reverse to return the stinger 100 to its home position.

Event 45: The stinger returning releases the switch LS-10 from under pressure.

Event 46: During the return stroke of the stinger 100, the switch LS-8 is briefly actuated.

Event 47: Actuation of the switch LS-8 brings about deenergization of relay 1 and energization of relay 7. As noted previously, the energization of the relay 7 brings about reverse rotation of the flier 38.

Event 48: Reverse rotation of the spindle 18 causes the cam element 164 to remove pressure from the switch LS-5.

Event 49: The stinger 100 returning to its home position puts switch LS-9 under pressure, restoring pressure in the air cylinder 78.

Event 50: Continued reverse rotation of the spindle 18 causes the cam element 162 to place the switch LS-4 under pressure. This deenergizes the relay 7 stopping reverse rotation of the flier, the switch LS-4 also energizes relay 8.

Event 51: Energization of relay 8 bring about energization of relay 9 which holds through switch LS-5. With both relay 9 and relay 4 energized the brake holding flier 26 is released and a clutch between flier 26 and the spindle 18 is engaged so that when the spindle 18 next rotates both fliers will rotate.

Event 52: Also, with relay 9 energized, the lead mechanism is extended for a short lead pull. With the lead mechanism fully extended, the switch LS-11 is brought off pressure.

Event 53: Switch LS-11 off pressure energizes the relay 6 which starts the fliers in their normal forward run rotation.

Referring back to Event 27, it was there noted that the switch LS-11 was inactive. At that time, switch LS-30 was under pressure. Taking switch LS-30 off pressure at Event 36 energized the electrical circuit to LS-11 so that in the present Event, with switch LS-11 coming off pressure, this switch is capable of energizing relay 6 to start the fliers 26 and 38 in their normal run forward movement.

This difference in operation is necessitated by the fact that Event 27 and the neighboring Events occurred after the winding of the first coil in a two coil per slot winding. A back index of the armature was then necessary to set the armature up for the second coil. To this end, the stinger 100 was in the elevated position during Event 27. As the stinger 100 returned, in Event 29, the switch LS-8 was actuated so that, in Event 30, the flier 38 was placed in motion.

By contrast, the present Event occurs after two successive coils have been wound so that the succeeding coils will be wound into a different slot pair in the armature. Accordingly, there has been an advance index of the armature in Event 43, but there has been no back index of the armature prior to the present Event as occurred in Event 26 prior to Event 27. This means that the stinger 100 is not in position to actuate switch LS-8 to start the normal run of the fliers, as occurred in Event 29. Switch LS-11 supplies this function in the present Event. The fliers 26 and 38 simultaneously proceed to oppositely wind coils.

Event 54: With the spindle 18 now rotating, the cam element 162 moves the switch LS-4 from under pressure.

Event 55: With further rotation of the spindle 18, the cam element 164 places the switch LS-5 under pressure.

Event 56: Actuation of this switch LS-5 brings about deenergization of relay 9.

Event 57: With the relay 9 deenergized, the lead mechanism returns to its normal position and the switch LS-11 is therefore replaced under pressure.

Event 58: As the shaft 140 rotates, cam element 200 places the switch LS-7 under pressure. This brings about actuation of the air cylinder 174 bringing the switches LS-4, LS-5 and LS-6 out of engagement with their respective cams.

Event 59: Continued rotation of the shaft 140 causes the pawl element 156 engaging the ratchet 154 to rotate the shaft 146 through one notch on the ratchet 154. This brings the switch LS-22 briefly under pressure. The switch LS-22 operates a cutter, not shown, which is used when the coil winding machine is in continuous operation winding one armature after the other. The cutter severs the connecting strands between the previously wound armature and the armature being currently wound. This frees the previously wound armature for removal from the coil winding machine.

Event 60: Completed movement of the shaft 146 through the equivalent of one notch on the ratchet wheel 154 causes the cam element 224 to remove pressure from the switch LS-22. Thus, the switch LS-22 has been briefly energized only during the time the shaft 146 is rotated through one notch on the ratchet wheel 154.

Event 61: The shaft 146 having moved the equivalent of one notch on the ratchet wheel 154, the switches LS-18 and LS-30 are put under pressure by their respective cams 220 and 226.

Event 62: The switch LS-18 energizes the relay 5 and the switch LS-30 deenergizes the relay 4. This prepares the lead mechanism for pulling a long lead at the termination of the winding of the present coils by the fliers 26 and 38.

Event 63: Continued rotation of the shaft 140 causes the cam element 202 to actuate the switch LS-19 briefly.

Event 64: With actuation of the switch LS-19, relay 1 is energized and holds.

Event 65: Energization of relay 1 brings about deenergization of relay 8. As described previously, this prevents actuation of the lead pull mechanism until the armature has been advanced through operation of relay 1 after the present coils have been wound.

Event 66: Continued rotation of the shaft 140 brings the cam element 204 into position to actuate the cam follower 206 regulating the throttle valve. This slows down the speed of rotation of the fliers 26 and 38. Simultaneously, the cam element 200 places the switch LS-7 under pressure deenergizing the air cylinder 174 thereby permitting the switches LS-4, LS-5 and LS-6 to move into contact with their respective cam elements.

Event 67: With the fliers 26 and 38 in their final cycle of rotation in winding the present coils, the switch LS-5 is placed under pressure by its cam element 164. This breaks the holding circuit to relay 6 stopping the hydraulic motor 12.

Event 68: With the relay 6 deenergized, and with relay 1 energized, the air cylinders 102 and 108 are actuated to elevate the stinger 100 to rotate the armature held by the chuck members 48 in the counterclockwise direction. As the stinger 100 rises, pressure is removed from the switch LS-9, neutralizing the air cylinder 78.

Event 69: With the stinger 100 fully elevated, switch LS-10 is brought under pressure. The switch LS-10 causes a return of the stinger 100 to its home position.

Event 70: As the stinger 100 returns to its home position, switch LS-10 is brought from under pressure.

Event 71: On the return stroke of the stinger 100, the switch LS-8 is briefly actuated.

Event 72: Actuation of the switch LS-8 brings about deenergization of the relay 1 and energization of the relay 7. The relay 7 brings about reverse rotation of the fliers 26 and 38.

Event 73: Reverse rotation of the fliers and therefore the spindle 18 causes the cam element 164 to place the switch LS-5 under pressure.

Event 74: With the stinger 100 completely returned to its home position the switch LS-9 is brought back under pressure, restoring pressure to the air cylinder 78.

Event 75: With continued reverse rotation of the spindle 18 the switch LS-4 is brought under pressure by its cam element 162. This brings about deenergization of the relay 7 stopping rotation of the fliers 26 and 38. The switch LS-4 also brings about energization of the relay 8.

Event 76: The deenergization of relay 7 brings about energization of the air cylinders 102 and 108 for elevating the stinger 100 to return the armature through one slot in the clockwise direction. This prepares the armature for winding of the second pairs of coils in the second slot pairs. Elevation of the stinger 100 has removed pressure from the switch LS-9 neutralizing air cylinder 78. Also, energization of relay 8 has caused energization of relay 9.

Event 77: Energization of the relay 9 causes the lead mechanism to extend for pulling a short lead. Almost simultaneously, the stinger 100 being fully elevated has placed the switch LS-10 under pressure bringing about a reverse energization of the air cylinder 102 to cause the stinger 100 to return to its home position. Extension of the lead mechanism for pulling a short lead takes pressure off the switch LS-11, which is now inactive due to the fact that switch LS-30 is under pressure.

Event 78: The stinger 100 on its return stroke releases switch LS-10 from pressure.

Event 79: During the return stroke of the stinger 100, the switch LS-8 is briefly actuated.

Event 80: Actuation of switch LS-8 at this time brings about energization of the relay 6, starting the motor 12 in its normal run forward direction.

Event 81: With the spindle 18 starting to rotate, cam element 162 places switch LS–4 off pressure. Almost simultaneously, the stinger 100 has returned to its home position bringing switch LS–9 under pressure, restoring pressure to the air cylinder 78.

Event 82: With continued forward rotation of the spindle 18, switch LS–5 is briefly actuated by its cam element 164.

Event 83: Actuation of switch LS–5 brings about deenergization of relay 9.

Event 84: The deenergization of relay 9 restores the lead mechanism to its normal position where the switch LS–11 is brought under pressure.

Event 85: With continued rotation of the fliers 26 and 38, and consequent rotation of the shaft 140, the cam element 204 causes the cam follower 206 to operate the throttle mechanism to speed up the rotation of the fliers 26 and 38 to their maximum speed. Simultaneously, the cam element 200 places the switch LS–7 under pressure causing energization of the air cylinder 174 to bring the switches LS– 4, LS–5 and LS–6 out of engagement with their respective cam elements.

The coil winding machine will now cycle continuously from Event 36 to Event 85 inclusive until the last s'ot of the armature is being wound with its second coil. Through this cyclic operation all of the slot pairs of the armature will receive two coils. During the winding of the last pair of coils in the last slot pairs, cam 222 on the shaft 146 initiates the events which terminate the winding of the armature. These events are described in the following.

Event 86: With movement of the shaft 146 to its last position, corresponding to the final position of the armature the switches LS–18 and LS–21 are moved under pressure by their cam elements 220 and 222.

Event 87: Actuation of the switch LS–18 brings about deenergization of relay 5. Actuation of the switch LS–21 brings about deenergization of the relay 3. (Recall from Event 13 that the relay 3 has been holding the coil winding machine in its normal cyclic operation.)

Event 88: Continued rotation of the shaft 140 causes the cam element 202 to briefly actuate the switch LS–19.

Event 89: The switch LS–19 under pressure, and relay 3 deenergized, brings about energization of relay 2 and deenergization of relay 8. Recall that deenergization of relay 8 idles the lead mechanism 130 until the armature has been properly indexed. Relay 2 sets up the coil winding machine for final stopping at the termination of the winding of the last coil.

Event 90: Continued rotation of the shaft 140 causes the cam element 204 to actuate the cam follower 206 throttling down the speed of rotation of the hydraulic motor 12. Simultaneously, the cam element 204 places the switch LS–7 off pressure deenergizing the air cylinder 174 thereby permitting the switches LS–4, LS–5 and LS–6 to move into contact with their respective cams.

Event 91: With the switch LS–7 off pressure and the relay 2 energized, control over the relay 6 which eventually stops rotation of the hydraulic motor 12 is shifted from the switch LS–5 to the switch LS–6. In the present Event the switch LS–6 is usefully actuated by its cam element 166 for the first time during the operation of the coil winding machine. This switch LS–6 now brings about deenergization of the relay 6 with consequent stopping of motor 12.

Event 92: With the relay 6 deenergized and the relay 2 energized, the chuck members 48 are caused to open by deenergization of the air cylinder 78. With deenergization of this air cylinder, the switch LS–3 is placed off pressure.

Event 93: With the switch LS–3 off pressure, the relay 2 is deenergized and the entire coil winding machine shuts down. The coil winding machine cannot be brought into further motion until the switch SW–1 has been depressed for the predetermined amount of time as described hereinbefore.

The foregoing illustrates the manner in which the coil winding machine is guided through a sequence of operation culminating in the winding of an odd slot armature with two coils per slot.

The cycle-gram of FIGURE 6 and the foregoing enumeration of events makes no reference to the auxiliary positioning device including the air cylinder 184 and the switch LS–31, illustrated in FIGURE 3. When this positioning device is found necessary, the air cylinder 184 is triggered along with the air cylinder 102 each time the stinger 100 is elevated. As the cam actuator 182 advances upon the cam 180, pin 188 actuates switch LS–31 opening the bypass for the motor 12. This enables adjustment of the position of the spindle 18. Actuation of the switch LS–10 upon full elevation of the stinger 100 is utilized to retract the air cylinder 184 as well as the air cylinder 102. Return of the air cylinder 184 takes pressure off the switch LS–31, closing the bypass for the motor 12. Thus, the air cylinder 184 operates in substantial synchronism with the air cylinder 102.

If an even slot armature is to be wound with two coils per slot the operation of the coil winding machine is briefly as follows. When operation of the machine has been initiated by depressing the switch SW–1 the machine operates through the events described above until Event 7 has occurred. Then, through suitable cam adjustments, all operations until Event 53 are skipped. The machine will then move through all Events from 53 to 85 whereupon the machine will cycle back to Event 36 and repeat from Event 36 to Event 85 inclusive until the last slot pair is being wound. At this time, operation of the switch LS–21 and the relay 2 cause the machine to operate from Event 85 to Event 93, terminating the winding operation.

When an odd slot armature is to be wound with one coil per slot, the machine operates as follows. With initiation of operation by actuation of the switch SW–1 all operations from Event 1 to Event 13 occur. Thereafter suitable cam adjustments are employed to skip all operations until Event 38 whereupon the machine will operate from Event 38 to Event 58, then return to Event 36 and cycle repeatedly from Event 36 through Event 58 inclusive until the last slot pair is being wound. Thereafter, the operation of the machine will be continued from Event 58 to and including Event 60, then all operations until Event 88 are omitted and thereafter the machine moves through Event 93 terminating the coil winding operation.

When an even slot armature is to be wound with one coil per slot, the machine operates as follows. Upon actuation of the switch SW–1 the machine operates through Event 7, thereafter all events are omitted until Event 53. The machine then moves through Events 53 to 58 inclusive, then returns to Event 36 and will cycle through Events 36 to 58 inclusive until the last slot pair is being wound. Thereafter, the operation of the machine will continue past Event 58 through Event 60, then, all events will be skipped until Event 88, whereafter the machine will move through Event 93 terminating the coil winding operation.

Clearly, the foregoing examples do not exhaust the possible combinations of operations which may be performed with the present coil winding machine. It will, of course, be apparent to one skilled in the art that numerous combinations of switches, relays, and cam lines may be employed for accomplishing the operation of the machine as described hereinbefore. Such modifications are deemed to be within the scope of the present invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a hydraulically driven coil winding machine for winding coils onto a receiving form provided with a plurality of slots for receiving a plurality of successively wound coils, said machine including a flier for winding coils, power means for rotating said flier, means supporting said receiving form for receiving coils wound by said flier, first cam means, means for rotating said first cam means in proportion to the rotation of said flier, means including a cam follower responsive to said first cam means for stopping the rotation of said flier after a coil of a given number of turns has been wound, means responsive to said first cam means for indexing said receiving form to present new slots thereof to said flier for receiving a coil, and means responsive to said indexing means for reinitiating rotation of said flier to wind another coil upon said receiving form, the improvement wherein said power means comprises a hydraulic motor having a rotary output powered by a hydraulic fluid under pressure, and means responsive to the output of the motor for controlling the power input to the motor comprising second cam means, means for rotating said second cam means in proportion to the rotary output of said motor, and means including a cam follower responsive to said second cam means for regulating the hydraulic power supplied to said motor whereby the speed of rotation of said flier is varied during the time said flier is rotated to wind a coil.

2. In a coil winding machine for winding coils onto a receiving form provided with a plurality of slots for receiving a plurality of successively wound coils, said machine including means supplying wire for winding into coils, means for supporting said receiving form for receiving coils, and means for indexing the position of said receiving form so as to position said receiving form to receive successively wound coils, the improvement including a hydraulic motor having a rotary output for imparting relative rotation to said supply means and said receiving form support means so as to wind coils, a source of fluid under pressure for powering said hydraulic motor, and means responsive to the output of the motor for controlling the power input to the motor, said last named means comprising cam means rotated in proportion to the rotational movement of said motor, and throttle means including a cam follower responsive to said cam means for regulating the hydraulic power supplied to said motor whereby the speed of rotation of said motor is varied during the time coils are wound.

3. The improvement according to claim 2 including second cam means responsive at a predetermined angular position of said wire supply means relative to said receiving form support means for interrupting the supply of hydraulic power to said motor so as to stop said motor, and third cam means rotated in proportion to the relative rotational movement between said supply means and said support means for disengaging said second cam means for predetermined intervals.

4. In a hydraulically driven coil winding machine for winding coils onto a receiving form provided with a plurality of slots for receiving a plurality of successively wound coils, said machine including a flier for winding coils, means supporting said receiving form for receiving coils wound by said flier, and a hydraulic motor and associated fluid power supply for imparting rotation to said flier, the improvement including first cam means responsive to the angular position of said flier for interrupting the supply of fluid power to said flier to stop said flier at a predetermined position, and second cam means responsive to the angular rotation of said flier for disengaging said first cam means for predetermined intervals.

5. In a hydraulically driven coil winding machine for winding coils onto a receiving form provided with a plurality of slots for receiving a plurality of successively wound coils, said machine including a flier for winding coils, means supporting said receiving form for receiving coils wound by said flier, and a hydraulic motor and associated fluid power supply for imparting rotation to said flier, the improvement including first cam means responsive to the angular position of said flier for interrupting the supply of fluid power to said flier to stop said flier at a predetermined position, second cam means responsive to the angular rotation of said flier for disengaging said first cam means for predetermined intervals, a throttle valve for regulating the flow of fluid power to said motor, and third cam means responsive to the angular rotation of said flier for operating said throttle valve to adjust the speed of rotation of said motor as coils are wound by said flier.

6. In a hydraulically driven coil winding machine for winding coils onto a receiving form provided with a plurality of slots for receiving a plurality of successively wound coils, said machine including a flier for winding coils, means supporting said receiving form for receiving coils wound by said flier, and a hydraulic motor and associated fluid power supply for imparting rotation to said flier, the improvement including first cam means responsive to the angular rotation of said flier for interrupting the supply of fluid power to said flier to stop said flier at a predetermined position, second cam means responsive to the angular rotation of said flier for disengaging said first cam means for predetermined intervals, and third cam means responsive to the angular position of said flier for reversing the flow of fluid power to said motor so as to reverse the direction of rotation of said flier when said flier has reached a predetermined angular position, said second cam means operating to disengage said third cam means simultaneously with said first cam means.

7. A coil winding machine for winding coils onto a receiving form including means supporting said receiving form to receive a coil, means supplying wire for winding into a coil, a hydraulic motor having a rotary output for imparting relative rotation to said support means and said supply means so as to wind a coil upon said receiving form, means providing fluid power for driving said motor, a throttle valve for varying the amount of fluid power delivered to said motor, and means responsive to the rotary output of said motor and said supply means for regulating said throttle valve to vary input to said motor and thereby vary the speed of said motor during the time a coil is being wound.

8. The coil winding machine according to claim 7, wherein said hydraulic motor is a positive displacement motor, said coil winding machine including a valve for simultaneously closing the fluid inlet and outlet for said motor to stop and brake said motor, control means responsive to the angular position of said supply means relative to said receiving form support means for operating said valve to stop said motor, and means responsive to the amount of angular rotation imparted to said support means and said supply means for rendering said control means inoperative during the time a coil is wound.

9. A coil winding machine for winding coils upon a receiving form provided with a plurality of slots for receiving a plurality of successively wound coils, said machine including means for supporting said receiving form, means supplying wire for winding upon said form, a positive displacement hydraulic motor and associated fluid power supply for imparting relative rotation to said support means and said wire supply means to wind a coil, said motor having a fluid inlet and a fluid outlet, a control valve for said fluid power supply having a first position connecting said power supply to said inlet to rotate said motor in a given direction, a second position simultaneously closing the fluid inlet and outlet to stop and brake said motor, and a third position connecting said power supply to said outlet to reverse the direction of rotation of said motor, said motor when said control valve is in said first position rotating to wind a coil into a pair of slots in said receiving form, first means responsive to the relative positions of said wire supply means and said support means for actuating said control valve to the second position when a coil has been wound to thereby stop the motor, second means responsive to operation of said first means for indexing said receiving form to a new position upon its support means to present a new pair of slots for receiving a coil, third means responsive to actuation of said second means for actuating said control valve to the third position thereby reversing rotation of said motor, fourth means responsive to the relative positions of said wire supply means and said support means during reverse rotation of said motor for actuating said control valve to the second position thereof to stop reverse rotation of said motor, fifth means responsive to said fourth means for pulling a lead of the wire being wound, and sixth means responsive to operation of said fifth means for actuating said control valve to the first position thereof to initiate the winding of a coil.

10. The coil winding machine according to claim 9 including a throttle valve for said fluid power supply and means responsive to the amount of relative rotation imparted to said wire supply means and said support means during the winding of a coil for adjusting said throttle valve so as to vary the speed of rotation of said motor during the winding of a coil.

11. The coil winding machine according to claim 9 wherein said first and fourth means each include a cam and a cam follower, said coil winding machine including a first cam line carrying said cams rotating at an angular speed equal to the speed of relative rotation of said supply means and said support means, a second cam line rotating through one revolution with the formation of each coil, and cam means responsive to said second cam line for disengaging the cam followers of said first and fourth means from their respective cams for predetermined intervals.

12. A coil winding machine for winding coils upon a receiving form provided with a plurality of slots for receiving a plurality of successively wound coils, said machine including means for supporting said receiving form, means supplying wire for winding upon said form, a positive displacement hydraulic motor and associated fluid power supply for imparting relative rotation to said support means and said wire supply means to wind a coil, said motor having a fluid inlet and a fluid outlet, a control valve for said fluid power supply having a first position connecting said power supply to said inlet to rotate said motor, a second position simultaneously closing the fluid inlet and outlet to stop and brake said motor, and a third position connecting said power supply to said outlet to reverse said motor, said motor when said control valve is in said first position rotating to wind a coil into a pair of slots in said receiving form, first means responsive to the relative positions of said wire supply means and said support means for actuating said control valve to the second position when a coil has been wound to thereby stop the motor, second means responsive to operation of said first means for indexing said receiving form to a new position upon its support means to present a new pair of slots for receiving a coil, third means responsive to actuation of said first means for actuating said control valve to the third position thereby initiating reverse rotation of said motor, fourth means responsive to the relative positions of said wire supply means and said support means during reverse rotation of said motor for actuating said control valve to the second position thereof to stop reverse rotation of said motor, fifth means responsive to said fourth means for indexing said receiving form in reverse to return said receiving form to its previous position, and sixth means responsive to said fifth means for actuating said control valve to the first position thereof to initiate the winding of a second coil over the previously wound coil.

13. The method of winding a coil upon a receiving form including the steps of supporting the receiving form to receive a coil, supplying wire for winding into a coil to the receiving form, supplying power to one of said receiving form and wire supply components so as to impart relative rotation thereto to wind a coil, and varying the amount of power supplied in accordance with the total relative rotation between said components to increase the speed of relative rotation in a controlled manner to substantially a constant value after the winding has commenced and to decrease the speed of relative rotation in a controlled manner as the coil nears completion, and interrupting the supply of power to halt the relative rotation of the receiving form and the wire supply at completion of the coil.

14. In a coil winding machine for winding coils onto a receiving form provided with a plurality of slots for receiving a plurality of successively wound coils, said machine including means supplying wire for winding into coils, means for supporting said receiving form for receiving coils, and means for indexing the position of said receiving form so as to position said receiving form to receive successively wound coils, the improvement including a hydraulic motor for imparting relative rotation to said supply means and said receiving form support means so as to wind coils, a source of fluid under pressure for powering said hydraulic motor, first cam means rotated in proportion to the rotational movement of said motor, throttle means including a cam follower responsive to said first cam means for regulating the hydraulic power supply to said motor so as to vary the speed of rotation of said motor during the time coils are wound, second cam means responsive at a predetermined angular position of said wire supply means relative to said receiving form support means for interrupting the supply of hydraulic power to said motor so as to stop said motor, and third cam means rotated in proportion to the relative rotational movement between said supply means and said support means for disengaging said second cam means for predetermined intervals.

References Cited in the file of this patent
UNITED STATES PATENTS

| | | |
|---|---|---|
| 2,279,693 | Martin | Apr. 14, 1942 |
| 2,627,379 | Moore | Feb. 3, 1953 |
| 2,670,145 | Biddison | Feb. 23, 1954 |
| 2,837,896 | Cox | June 10, 1958 |

UNITED STATES PATENT OFFICE
CERTIFICATE OF CORRECTION

Patent No. 3,013,737                                December 19, 1961

Harry W. Moore

It is hereby certified that error appears in the above numbered patent requiring correction and that the said Letters Patent should read as corrected below.

Column 9, line 1, for "at" read -- as --; line 49, for "reelase" read -- release --; line 63, after "winding" insert -- such --; column 10, line 27, for "he" read -- the --; column 13, line 49, for "of" read -- the --; line 68, for "denergized" read -- deenergized --; column 14, line 7, for "though" read -- through --; column 18, line 17, for "swtich" read -- switch --; column 20, lines 50 and 51, strike out "and said supply means".

Signed and sealed this 30th day of October 1962.

(SEAL)
Attest:

ERNEST W. SWIDER
Attesting Officer

DAVID L. LADD
Commissioner of Patents